United States Patent
Hirose et al.

(10) Patent No.: US 8,048,527 B2
(45) Date of Patent: Nov. 1, 2011

(54) SHAPED EXPANDED GRAPHITE ARTICLE AND METHOD FOR PRODUCING THE SAME

(75) Inventors: Yoshiaki Hirose, Kagawa (JP); Takao Matsui, Kagawa (JP)

(73) Assignees: Toyo Tanso Co., Ltd., Osaka-shi (JP); Oiles Corporation, Tokyo (JP)

( * ) Notice: Subject to any disclaimer, the term of this patent is extended or adjusted under 35 U.S.C. 154(b) by 14 days.

(21) Appl. No.: 10/526,350

(22) PCT Filed: Sep. 3, 2003

(86) PCT No.: PCT/JP03/11224
§ 371 (c)(1), (2), (4) Date: Sep. 13, 2005

(87) PCT Pub. No.: WO2004/024624
PCT Pub. Date: Mar. 25, 2004

(65) Prior Publication Data
US 2006/0093823 A1 May 4, 2006

(30) Foreign Application Priority Data
Sep. 4, 2002 (JP) .................. 2002-259402

(51) Int. Cl.
*B32B 9/00* (2006.01)
(52) U.S. Cl. .................. 428/408; 423/447.1

(58) Field of Classification Search .......... 428/408; 423/445 R; 264/109
See application file for complete search history.

(56) References Cited

U.S. PATENT DOCUMENTS
| 4,244,934 A | * | 1/1981 | Kondo et al. | 423/448 |
| 4,837,073 A | * | 6/1989 | McAllister et al. | 428/212 |

FOREIGN PATENT DOCUMENTS
| EP | 1211221 | 6/2002 |
| JP | 52-035205 | 3/1977 |
| JP | 52-082912 | 7/1977 |
| JP | 55-080711 | 6/1980 |
| JP | 60-247041 | 12/1985 |
| JP | 10-130626 | 5/1998 |
| JP | 10-226573 | 8/1998 |

\* cited by examiner

*Primary Examiner* — David Sample
*Assistant Examiner* — Daniel H Miller
(74) *Attorney, Agent, or Firm* — Oblon, Spivak, McClelland, Maier & Neustadt, L.L.P.

(57) ABSTRACT

A formed exfoliated graphite article which comprises an oxidation-resistant coating layer formed at least in the surface layer portion thereof, preferably wherein the oxidation-resistant coating layer contains a boron element and a phosphorus element, the content of a boron element in the oxidation-resistant coating layer is 1 mass % or more, the content of a phosphorus in the oxidation-resistant coating layer is 0.1 mass % or more, and the oxidation-resistant coating layer is formed in a thickness of 0.5 μm or more.

17 Claims, 1 Drawing Sheet

| | ELEMENTAL ANALYSIS | | COATING LAYER (μm) | FLEXIBILITY | | RATE OF OXIDATION LOSS (mass%) at 800 °C for 3 hours in the air |
|---|---|---|---|---|---|---|
| | BORON (mass%) | PHOSPHORUS (mass%) | | LONGITUDINAL DIRECTION (times) | TRANSVERSE DIRECTION (times) | |
| EXAMPLE 1 | 15 | 2 | 20 | 13 | 22 | 10 |
| EXAMPLE 2 | 1 | 0.1 | 2 | 15 | 23 | 30 |
| EXAMPLE 3 | 30 | 3 | 50 | 10 | 18 | 2 |
| COMPARATIVE EXAMPLE 1 | 15 | 0 | 18 | 13 | 20 | 50 |
| COMPARATIVE EXAMPLE 2 | 0 | 2 | 0.2 | 15 | 25 | 95 |
| COMPARATIVE EXAMPLE 3 | 0.5 | 0.05 | 0.1 | 15 | 27 | 98 |

FIG. 1

|  | ELEMENTAL ANALYSIS | | COATING LAYER (μm) | FLEXIBILITY | | RATE OF OXIDATION LOSS (mass%) at 800 °C for 3 hours in the air |
|---|---|---|---|---|---|---|
|  | BORON (mass%) | PHOSPHORUS (mass%) |  | LONGITUDINAL DIRECTION (times) | TRANSVERSE DIRECTION (times) |  |
| EXAMPLE 1 | 15 | 2 | 20 | 13 | 22 | 10 |
| EXAMPLE 2 | 1 | 0.1 | 2 | 15 | 23 | 30 |
| EXAMPLE 3 | 30 | 3 | 50 | 10 | 18 | 2 |
| COMPARATIVE EXAMPLE 1 | 15 | 0 | 18 | 13 | 20 | 50 |
| COMPARATIVE EXAMPLE 2 | 0 | 2 | 0.2 | 15 | 25 | 95 |
| COMPARATIVE EXAMPLE 3 | 0.5 | 0.05 | 0.1 | 15 | 27 | 98 |

SHAPED EXPANDED GRAPHITE ARTICLE AND METHOD FOR PRODUCING THE SAME

TECHNICAL FIELD

The present invention relates to a shaped expanded graphite article having excellent oxidation resistance, and also to a method for producing the shaped expanded graphite article.

BACKGROUND ART

A shaped expanded graphite article is produced through the steps of: treating a graphite material such as natural graphite, kish graphite, pyrolytic graphite, etc., with a strong oxidant or the like such as concentrated sulfuric acid, concentrated nitric acid, hydrogen peroxide, etc., to thereby form a graphite interlayer compound; rapidly heating the graphite material (i.e., oxidized graphite material), which includes therein the graphite interlayer compound, at a high temperature of, e.g., 950 degrees C. or higher for 1-10 seconds, so as to generate pyrolysis gas whose gas pressure is used to expand a space between graphite layers and to form expanded graphite particles; and compression-forming or roll-forming the expanded graphite particles with or without using a binder. The shaped expanded graphite article produced in the above-described manner has various excellent properties, and is used as heat insulating materials, cushioning materials, and the like. An expanded graphite sheet obtained by forming the expanded graphite into a sheet shape using a roll, etc., is also widely used as gaskets, packings, sealings, and the like.

Recent years see a rapidly increasing need for general industrial equipment used at a high temperature such as gaskets used in automobiles or industrial packings used in oil plants and the like. The packings for general industries and the gaskets for automobiles are used in the air (i.e., in an oxygen-containing atmosphere) and at the same time used at a high temperature of 600 degrees C. or higher. Accordingly, it is required that a shaped expanded graphite article used for such packings and gaskets has a sheet form and suffers little oxidation loss.

According to a technique proposed in Japanese Patent Publication No. 57-15046 possessed by the present applicant, an expanded graphite sheet contains a boron component derived from a borate ester in order to obtain improved oxidation resistance. However, when this expanded graphite sheet was tried out as a gasket and a packing, there arose a problem that the boron component decomposed and scattered at a high temperature.

The present applicant has also proposed producing an oxidation-resistant expanded graphite sheet that contains phosphorus pentoxide and phosphate (in International Publication WO01/05703A1). The expanded graphite sheet proposed therein incurs no problem when used in the air at 600 degrees C. However, in a higher temperature range, e.g., at 650 degrees C. or higher, a rate of its oxidation loss is rapidly increased because a larger amount of carbon combines with oxygen contained in the air. Thus, there has been a problem that such an expanded graphite sheet can never be used at 750 degrees C. or higher.

An object of the present invention is to provide a shaped expanded graphite article that suffers little oxidation loss even at a high temperature in an oxygen-containing atmosphere, and also to provide a method for producing such a shaped expanded graphite article.

DISCLOSURE OF THE INVENTION

Wholehearted investigation the present inventors conducted in order to solve the aforementioned problem has revealed that an application of an oxidation-resistant coating to an expanded graphite sheet allows production of a shaped expanded graphite article which suffers little oxidation loss even at a high temperature in an oxygen-containing atmosphere or, to be more specific, even at 750 degrees C. or higher in the atmosphere. In this way, the present invention has been accomplished. Thus, a shaped expanded graphite article of the present invention has an oxidation-resistant coating layer.

In a shaped expanded graphite article of the present invention, it is preferable that the oxidation-resistant coating layer contains a boron element and a phosphorus element.

When a shaped expanded graphite article contains both of a boron element and a phosphorus element, a rate of its oxidation loss at 800 degrees C. can surely be lowered to 30 mass % or less.

In a method for producing a shaped expanded graphite article of the present invention, a shaped expanded graphite article is contacted with a solution containing a phosphorus element and a boron element, and then subjected to a heat treatment.

In a method for producing a shaped expanded graphite article of the present invention, in addition, graphite as a material is contacted with a solution containing a phosphorus element and a boron element, and then subjected to an expanding treatment followed by a shaping.

BRIEF DESCRIPTION OF THE DRAWINGS

FIG. 1 is a table of characteristics exhibited in Examples and Comparative Examples of the present invention.

BEST MODE FOR CARRYING OUT THE INVENTION

Here will be described a shaped expanded graphite article of the present invention, which has an oxidation-resistant coating layer and therefore has excellent oxidation resistance. In the present invention, a shaped expanded graphite article is a generic idea including sheet-shaped graphite and block-shaped expanded graphite. The sheet-shaped graphite is obtained by subjecting graphite powder, as a material, to an expanding treatment to thereby form an expanded graphite which is subsequently formed into a sheet shape using a shaping means such as rolling mills, compression forming machines, or the like. The state where an oxidation-resistant coating layer is formed in an outer layer portion includes at least a state where the oxidation-resistant coating layer is formed only in a surface portion or a state where a whole body, i.e., from a surface to a core, is formed of the oxidation-resistant coating layer. Oxidation resistance means that a rate of oxidation loss at 800 degrees C. in an oxygen-containing atmosphere, e.g., in the atmosphere is 30 mass % or less. Forming a coating layer includes forming a so-called coating on a surface of a shaped expanded graphite article, forming the coating on a shaped expanded graphite article and at the same time incorporating (impregnating) a part of the coating into the shaped expanded graphite article, and incorporating (impregnating) the coating to a certain depth (including to a core) of the shaped expanded graphite article, all of which are defined as being within the scope of the idea of coating layer.

In the shaped expanded graphite article of the present invention, it is preferable that the oxidation-resistant coating layer contains a boron element and a phosphorus element.

When a shaped expanded graphite article contains both of a boron element and a phosphorus element, a rate of its oxidation loss at 800 degrees C. can securely be lowered to 30 mass % or less. When a shaped expanded graphite article contains only one of a boron element and a phosphorus element, the object mentioned above cannot be accomplished.

In the shaped expanded graphite article of the present invention, a content of the boron element in the oxidation-resistant coating layer is preferably 1 mass % or more.

When the content of the boron element is less than 1 mass %, an obtained shaped expanded graphite article cannot have sufficient oxidation resistance. Thus, it is more preferable that the content of the boron element is 1-30 mass %. A content (mass %) referred to in the present invention is a percentage of each component contained in the total mass, which is defined as 100, of an expanded graphite sheet, a material containing a boron component, and a material containing a phosphorus element.

In the shaped expanded graphite article of the present invention, a content of the phosphorus element in the oxidation-resistant coating layer is preferably 0.1 mass % or more.

When the content of the phosphorus element is less than 0.1 mass %, an obtained shaped expanded graphite article cannot have sufficient oxidation resistance. Thus, it is more preferable that the content of the phosphorus element is 0.1-10 mass %.

In the shaped expanded graphite article of the present invention, it is preferable that the oxidation-resistant coating layer has a thickness of 0.5 μm or more.

When the thickness of the coating layer is less than 0.5 μm, the rate of oxidation loss at 800 degrees C. cannot be lowered to 30 mass % or less. An oxidation-resistant coating layer having a thickness of more than 1 mm is not preferable, because flexibility is impaired when shaped into, e.g., a sheet shape. It is therefore further preferable that the above-described oxidation-resistant coating layer has a thickness of 0.5 to 500 μm.

In the shaped expanded graphite article of the present invention, moreover, the boron element contained in the oxidation-resistant coating layer is preferably contained in one material or a combination of two or more materials selected from a group consisting of: simple boron; boron carbide; boron chloride; boron fluoride; boron bromide; boron iodide; boron nitride; boron oxide; boron silicide; an organic boron compound; and a compound containing boron and phosphorus.

Specific examples thereof include: boron, boron carbide, boron trichloride, boron trifluoride, boron nitride, borosilicate, and the like, among which further preferable are the boron carbide and the boron nitride because they are not easily decomposed (i.e., their decomposition temperature is high) and therefore can improve oxidation resistance.

In the shaped expanded graphite article of the present invention, moreover, it is preferable that the material that contains a boron element has an average particle diameter of 200 μm or less.

An average particle diameter of more than 200 μm is not preferable, because, in such a case, a gap formed between the boron compounds becomes larger, to enable oxygen to pass therethrough so that oxidation starts thereat. Therefore, it is further preferable that the compound containing a boron element has an average particle diameter of 0.5 to 50 μm.

In the shaped expanded graphite article of the present invention, moreover, the phosphorus element contained in the oxidation-resistant coating layer is preferably contained in one material or a combination of two or more materials selected from a group consisting of: simple phosphorus; phosphorus oxide; phosphorus carbide; phosphorus chloride; phosphorus fluoride; phosphorus bromide; phosphorus hydroxide; phosphorus nitride; phosphorus silicide; an organic phosphorous compound; and a compound containing phosphorus and boron.

Specific examples thereof include: phosphorus oxides such as phosphorus pentoxide, orthophosphoric acid, metaphosphoric acid, pyrophosphoric acid, polyphosphoric acid, biphosphate, etc.; phosphorus carbide; phosphorus trichloride; a compound of the foregoing phosphorus compound and other metallic or non-metallic elements such as aluminium phosphate, magnesium phosphate, calcium phosphate, potassium phosphate, aluminium biphosphate, magnesium biphosphate, calcium biphosphate, etc., among which further preferable are the aluminium phosphate, the orthophosphoric acid, and the metaphosphoric acid because their decomposition temperature is high and therefore they can improve oxidation resistance.

In addition, the shaped expanded graphite article of the present invention is preferably a sheet-shaped article.

Although the sheet is not particularly limited in its thickness, an article having a thickness of e.g., 0.1 to 3 mm is referred to as a "sheet". A sheet having a thickness of less than 0.1 mm fails to provide sufficient strength required as a sheet, and a sheet having a thickness of more than 3 mm fails to provide sufficient impermeability. An expanded graphite formed into a sheet shape can be used as various kinds of packings, gaskets, and the like.

In a method for producing a shaped expanded graphite article of the present invention, a shaped expanded graphite article is contacted with a solution containing a phosphorus element and a boron element, and then subjected to a heat treatment.

To be more specific, an expanded graphite or an expanded graphite sheet having been subjected to an expanding treatment is contacted, by spraying or applying, etc., with liquid (hereinafter referred to as a "solution") which has been obtained by dispersing or dissolving a compound containing a phosphorus element and a compound containing a boron element into a solvent such as water, alcohol, and acetone. Thereby, the phosphorus element and the boron element are contained into the expanded graphite or the expanded graphite sheet which is subsequently subjected to a heat treatment. This method is preferable for the purpose of forming an oxidation-resistant coating layer only in an outer layer portion of the shaped expanded graphite article.

In the method for producing a shaped expanded graphite article of the present invention, moreover, a material containing a boron element is preferably one material or a combination of two or more materials selected from a group consisting of: simple boron; boron carbide; boron chloride; boron fluoride; boron bromide; boron iodide; boron nitride; boron oxide; boron silicide; an organic boron compound; and a compound containing boron and phosphorus.

Specific examples thereof include: boron, boron carbide, boron trichloride, boron trifluoride, boron nitride, borosilicate, and the like, among which further preferable are the boron carbide and the boron nitride because they are not easily decomposed (i.e., their decomposition temperature is high) and besides can easily be dissolved or dispersed in a solution.

In the method for producing a shaped expanded graphite article of the present invention, moreover, it is preferable that the material containing a boron element has an average particle diameter of 200 μm or less.

It is not preferable that the compound containing a boron element has an average particle diameter of more than 200 μm, because such particles exhibit deteriorated dispersibility when dispersed or dissolved in water, etc., in order to form a solution. It is further preferable that the average particle diameter is 0.5 to 50 μm.

In the method for producing a shaped expanded graphite article of the present invention, moreover, a material containing a phosphorus element is preferably one material or a combination of two or more materials selected from a group consisting of: simple phosphorus; phosphorus oxide; phosphorus carbide; phosphorus chloride; phosphorus fluoride; phosphorus bromide; phosphorus hydroxide; phosphorus nitride; phosphorus silicide; an organic phosphorous compound; and a compound containing phosphorus and boron.

Specific examples thereof include: phosphorus oxides such as phosphorus pentoxide, orthophosphoric acid, metaphosphoric acid, pyrophosphoric acid, polyphosphoric acid, biphosphate, etc.; phosphorus carbide; phosphorus trichloride; compounds of the foregoing phosphorus compound and other metallic or non-metallic elements such as aluminium phosphate, magnesium phosphate, calcium phosphate, potassium phosphate, aluminium biphosphate, magnesium biphosphate, calcium biphosphate, etc., among which further preferable are the aluminium phosphate, the orthophosphoric acid, and the metaphosphoric acid because their decomposition temperature is high and besides they exhibit good water-solubility.

In the method for producing a shaped expanded graphite article of the present invention, moreover, it is preferable that the heat treatment is performed at 200 degrees C. or higher.

When the heat treatment is performed at lower than 200 degrees C., the terminal rate of oxidation loss cannot be lowered for unknown reasons. Although an atmosphere in which the heat treatment can be performed is exemplified by the air, an inert atmosphere and the like, no particular limitation is put thereon. However, the heat treatment is preferably performed in the air from the viewpoint of simplification of equipment or economical efficiency. Pressure applied during the heat treatment can also be exemplified by atmospheric pressure, reduced pressure, and the like. However, the atmospheric pressure is preferable for the same reason.

In the method for producing a shaped expanded graphite article of the present invention, in addition, graphite as a material is contacted with a solution containing a phosphorus element and a boron element, and then subjected to an expanding treatment followed by a shaping.

To be more specific, graphite as a material is dipped in a solution containing a phosphorus element and a boron element, and then taken out and dried up to be thereafter subjected to an expanding treatment which is followed by a shaping with rolls, compression-forming machines, or the like. After this, further, a heat treatment can be performed if necessary. This method is preferable for the purpose of forming an oxidation-resistant coating layer throughout the inside of the shaped expanded graphite article.

In the method for producing a shaped expanded graphite article of the present invention, moreover, a material containing a boron element is preferably one material or a combination of two or more materials selected from a group consisting of: simple boron; boron carbide; boron chloride; boron fluoride; boron bromide; boron iodide; boron nitride; boron oxide; boron silicide; an organic boron compound; and a compound containing a boron and a phosphorus.

Specific examples thereof include: boron, boron carbide, boron trichloride, boron trifluoride, boron nitride, borosilicate, and the like, among which further preferable are the boron carbide and the boron nitride because they are not easily decomposed (i.e., their decomposition temperature is high) and besides they can easily be dissolved or dispersed in a solution.

In the method for producing a shaped expanded graphite article of the present invention, moreover, it is preferable that the material containing a boron element has an average particle diameter of 200 μm or less.

It is not preferable that the compound containing a boron element has an average particle diameter of more than 200 μm, because such particles exhibit deteriorated dispersibility when dispersed or dissolved in water, etc., to form a solution. It is further preferable that the average particle diameter is 0.5 to 50 μm.

In the method for producing a shaped expanded graphite article of the present invention, moreover, a material containing a phosphorus element is preferably one material or a combination of two or more materials selected from a group consisting of: simple phosphorus; phosphorus oxide; phosphorus carbide; phosphorus chloride; phosphorus fluoride; phosphorus bromide; phosphorus hydroxide; phosphorus nitride; phosphorus silicide; an organic phosphorous compound; and a compound containing phosphorus and boron.

Specific examples thereof include: phosphorus oxides such as phosphorus pentoxide, orthophosphoric acid, metaphosphoric acid, pyrophosphoric acid, polyphosphoric acid, biphosphate, etc.; phosphorus carbide; phosphorus trichloride; compounds of the foregoing phosphorus compounds and other metallic or non-metallic elements such as aluminium phosphate, magnesium phosphate, calcium phosphate, potassium phosphate, aluminium biphosphate, magnesium biphosphate, calcium biphosphate, etc., among which further preferable are the aluminium phosphate, the orthophosphoric acid, and the metaphosphoric acid because their decomposition temperature is high and besides they exhibit good water-solubility.

There has not been identified a detailed mechanism concerning why the oxidation loss of the shaped expanded graphite article of the present invention is reduced (i.e., why the oxidation-resistance thereof is improved). Supposedly, the phosphorus element and the boron element combine with each other as a result of the heat treatment to thereby form a compound of phosphorus and boron, which improves the oxidation resistance all the more as compared with a shaped expanded graphite article that contains a phosphorus element alone or a boron element alone.

The above-described preferable embodiments can variously be combined to carry out the present invention. In addition, the present invention is not limited to the above-described preferable embodiments. Other various embodiments may be practicable without departing from the spirit and scope of the present invention.

Given in the following is a specific description of the present invention in conjunction with Examples, to which the present invention is not limited however.

EXAMPLE 1

(1) Preparing an Expanded Graphite

First, acid-treated graphite (manufactured by Sumitomo Chemical Company, Limited) was put into an expansion furnace heated to 1000 degrees C., and thus subjected to an expanding treatment to be expanded 200 times. An obtained expanded graphite had a bulk density of 0.003 g/cm$^3$.

(2) Preparing a Solution That Contains a Phosphorus Element and a Boron Element

Boron carbide having an average particle diameter of 30 μm (manufactured by KCM Corporation) and orthophosphoric acid (manufactured by Wako Pure Chemical Industries, Ltd.) were weighed out 56 g and 14 g, respectively, and were dispersed in pure water 200 ml.

(3) Weighing Out an Expanded Graphite

Of the expanded graphite obtained in (1), 280 g was weighed out and put into a plastic case.

(4) Compression-Forming With a Roll

The expanded graphite was compression-formed with a roll into a sheet having a thickness of 3 mm and a bulk density of 0.17 g/cm$^3$. Then, the solution 200 ml prepared in (2) was sprayed on the obtained sheet by means of a sprayer.

(5) Conditions for a Heat Treatment

The expanded graphite sheet obtained in (4) was heat-treated at 700 degrees C. in the air under atmospheric pressure, to form an expanded graphite sheet which was subsequently rolled with a roll into an expanded graphite sheet having a thickness of 0.5 mm and a bulk density of 1.0 g/cm$^3$.

EXAMPLE 2

The same boron carbide as used in Example 1 having an average particle diameter of 30 μm and the same orthophosphoric acid as used in Example 1 were weighed out 5.6 g and 1.1 g, respectively, and were dispersed in pure water 200 ml. Thus, the amount of phosphorus element which would be sprayed on the expanded graphite was changed. Except the above, the same operations as (1), (3), (4), and (5) of Example 1 were performed under the same conditions.

EXAMPLE 3

The same boron carbide as used in Example 1 and the same orthophosphoric acid as used in Example 1 were weighed out 112 g and 21 g, respectively, and were dispersed in pure water 200 ml. Thus, the amount of phosphorus element and the amount of boron element which would be sprayed on the expanded graphite were changed. Except the above, the same operations as (1), (3), (4), and (5) of Example 1 were performed under the same conditions, to obtain an expanded graphite sheet.

COMPARATIVE EXAMPLE 1

The same boron carbide as used in Example 1 was weighed 56 g and dispersed in pure water 200 ml. Except the above, the same operations as (1), (3), (4), and (5) of Example 1 were performed under the same conditions, to obtain an expanded graphite sheet.

COMPARATIVE EXAMPLE 2

The same orthophosphoric acid as used in Example 1 was weighed 20 g and dispersed in pure water 200 ml. Except the above, the same operations as (1), (3), (4), and (5) of Example 1 were performed under the same conditions, to obtain an expanded graphite sheet.

COMPARATIVE EXAMPLE 3

The same boron carbide as used in Example 1 and the same orthophosphoric acid as used in Example 1 were weighed out 2.8 g and 0.5 g, respectively, and were dispersed in pure water 200 ml. Except the above, the same operations as (1), (3), (4), and (5) of Example 1 were performed under the same conditions, to obtain an expanded graphite sheet.

The expanded graphite sheets manufactured in Examples 1 to 3 and Comparative Examples 1 to 3 were examined for the following characteristics.

(1) A 50 g sample of each expanded graphite sheet was heated at 900 degrees C. for 50 hours to be ashed, and then examined for existence of phosphorus and boron by use of XMA (i.e., X-rays Micro Analyzer).

(2) A coating layer formed on a surface of each of the expanded graphite sheets was measured for thickness by use of an electron microscope.

(3) Flexibility was measured by a method disclosed in International Publication No. WO01/05703A1.

(4) Each of the expanded graphite sheets was processed into a size of 25×25×0.5 (mm), and left in an electric furnace (of air atmosphere) at 800 degrees C. for three hours. Based on its weight change associated with the heating in the electric furnace, rate of its oxidation loss (mass (%)) was calculated out.

Results obtained therefrom are shown in TABLE 1 of FIG. 1.

Seen from TABLE 1 is that the expanded graphite sheets of Examples 1 to 3 hardly lost their flexibility, etc., and besides rates of their oxidation loss at 800 degrees C. were conspicuously lower than those of the expanded graphite sheets of Comparative Examples.

INDUSTRIAL APPLICABILITY

The shaped expanded graphite article of the present invention suffers little oxidation loss even at a high temperature of 800 degrees C. or higher (where a certain amount of oxygen exists), and therefore can widely be applied to, for example, general industrial equipment used at high temperatures such as gaskets used in automobiles or industrial packings used in oil plants and the like.

The invention claimed is:

1. A shaped expanded graphite article comprising:
   at least in an outer layer portion, and
   an oxidation-resistant coating layer,
   wherein the oxidation-resistant coating layer has a thickness of 0.5 μm or more, and comprises boron and phosphorus, the content of the boron in the oxidation-resistant coating layer being 15 mass % or more and the content of the phosphorus in the oxidation-resistant coating layer being 2 mass % or more, and
   wherein the content of the boron in the oxidation-resistant coating layer is greater than the content of the phosphorous in the oxidation-resistant coating layer.

2. The shaped expanded graphite article according to claim 1, wherein the boron contained in the oxidation-resistant coating layer is contained in at least one material selected from the group consisting of boron, boron carbide, boron chloride, boron fluoride, boron bromide, boron iodide, boron nitride, boron oxide, boron silicide, an organic boron compound, and a compound comprising boron and phosphorus.

3. The shaped expanded graphite article according to claim 2, wherein the material that comprises the boron has an average particle diameter of 200 μm or less.

4. The shaped expanded graphite article according to claim 1, wherein the phosphorus in the oxidation-resistant coating layer is comprised in at least one material selected from the group consisting of phosphorus, phosphorus oxide, phosphorus carbide, phosphorus chloride, phosphorus fluoride, phosphorus bromide, phosphorus hydroxide, phosphorus nitride, phosphorus silicide, an organic phosphorous compound, and a compound comprising phosphorus and boron.

5. The shaped expanded graphite article according to claim 1, wherein a shaped expanded graphite article is a sheet shape.

6. The shaped expanded graphite article according to claim 1, wherein the content of the boron in the oxidation-resistant coating layer is 15-30 mass % and the content of the phosphorus in the oxidation-resistant coating layer is 2-10 mass %.

7. A method for producing a shaped expanded graphite article having an oxidation-resistant coating layer, comprising contacting a shaped expanded graphite article with a solution comprising phosphorus and boron, thereby forming a coating layer of said solution on a surface of said article, and then subjecting said graphite article to a heat treatment to produce said shaped expanded graphite article comprising said oxidation-resistant coating layer comprising 2 mass % or more of said phosphorus and 15 mass % or more of said boron;

wherein the content of the boron in the oxidation-resistant coating layer is greater than the content of the phosphorous in the oxidation-resistant coating layer.

8. The method for producing a shaped expanded graphite article according to claim 7, wherein a material comprising boron is at least one material selected from the group consisting of boron, boron carbide, boron chloride, boron fluoride, boron bromide, boron iodide, boron nitride, boron oxide, boron silicide, an organic boron compound, and a compound comprising boron and phosphorus.

9. The method for producing a shaped expanded graphite article according to claim 8, wherein the material comprising boron has an average particle diameter of 200 μm or less.

10. The method for producing a shaped expanded graphite article according to claim 7, wherein a material comprising phosphorus is at least one material selected from the group consisting of phosphorus, phosphorus oxide, phosphorus carbide, phosphorus chloride, phosphorus fluoride, phosphorus bromide, phosphorus hydroxide, phosphorus nitride, phosphorus silicide, an organic phosphorous compound, and a compound comprising phosphorus and boron.

11. The method for producing a shaped expanded graphite article according to claim 7, wherein the heat treatment is performed at 200 degrees C. or higher.

12. A method for producing a shaped expanded graphite article having an oxidation-resistant coating layer, comprising contacting graphite as a material with a solution comprising phosphorus and boron, thereby forming a coating layer of said solution on a surface of said graphite, said coating layer comprising 2 mass % or more of said phosphorus and 15mass % or more of said boron, wherein the content of the boron in the oxidation-resistant coating layer is greater than the content of the phosphorous in the oxidation-resistant coating layer;

subjecting said graphite to an expanding treatment, and then shaping said graphite.

13. The method for producing an oxidation-resistant shaped expanded graphite article according to claim 12, wherein a material comprising boron is at least one material selected from the group consisting of boron, boron carbide, boron chloride, boron fluoride, boron bromide, boron iodide, boron nitride, boron oxide, boron silicide, an organic boron compound, and a compound comprising boron and phosphorus.

14. The method for producing a shaped expanded graphite article according to claim 13, wherein the material comprising boron has an average particle diameter of 200 μm or less.

15. The method for producing a shaped expanded graphite article according to claim 12, wherein a material comprising phosphorus is at least one material selected from the group consisting of phosphorus, phosphorus oxide, phosphorus carbide, phosphorus chloride, phosphorus fluoride, phosphorus bromide, phosphorus hydroxide, phosphorus nitride, phosphorus silicide, an organic phosphorous compound, and a compound comprising phosphorus and boron.

16. A shaped expanded graphite article, comprising:

an oxidation resistant coating layer provided to at least an outer layer portion of the shaped expanded graphite article, wherein the oxidation-resistant coating layer is (i) disposed on the surface of the shaped expanded graphite and at least partially incorporated into the shaped expanded graphite article, (ii) incorporated only to a certain depth of the shaped expanded graphite article, or (iii) incorporated to a core of the shaped expanded graphite article, wherein the oxidation-resistant coating layer comprises boron and phosphorus;

a content of the boron in the oxidation-resistant coating layer is 15 mass % or more;

a content of the phosphorus in the oxidation-resistant coating layer is 2mass % or more;

the content of the boron is higher than the content of the phosphorus; and the oxidation-resistant coating layer has a thickness of 0.5 μm or more.

17. A shaped expanded graphite article comprising an oxidation-resistant coating layer, wherein the oxidation-resistant coating layer has a thickness of 0.5 μm or more, and comprises boron and phosphorus, the content of the boron element in the oxidation-resistant coating layer being 15 mass % or more and the content of the phosphorus in the oxidation-resistant coating layer being 2 mass % or more, the content of the boron in the oxidation-resistant coating layer is greater than the content of the phosphorous in the oxidation-resistant coating layer, and said oxidation-resistant coating layer is on a surface of said shaped-expanded graphite article.

* * * * *

UNITED STATES PATENT AND TRADEMARK OFFICE
CERTIFICATE OF CORRECTION

| | |
|---|---|
| PATENT NO. | : 8,048,527 B2 |
| APPLICATION NO. | : 10/526350 |
| DATED | : November 1, 2011 |
| INVENTOR(S) | : Yoshiaki Hirose et al. |

It is certified that error appears in the above-identified patent and that said Letters Patent is hereby corrected as shown below:

Column 10, line 45, "the content of the boron element in the" should read --the content of the boron in the--.

Signed and Sealed this
Fourteenth Day of February, 2012

David J. Kappos
*Director of the United States Patent and Trademark Office*